(12) United States Patent
Gelfand et al.

(10) Patent No.: US 8,768,070 B2
(45) Date of Patent: Jul. 1, 2014

(54) METHOD, APPARATUS AND COMPUTER PROGRAM PRODUCT FOR PROVIDING IMAGE MODIFICATION

(75) Inventors: Natasha Gelfand, Sunnyvale, CA (US);
Wei-Chao Chen, Los Altos, CA (US);
Kari Antero Pulli, Palo Alto, CA (US)

(73) Assignee: Nokia Corporation, Espoo (FI)

( * ) Notice: Subject to any disclaimer, the term of this patent is extended or adjusted under 35 U.S.C. 154(b) by 1164 days.

(21) Appl. No.: 12/147,636

(22) Filed: Jun. 27, 2008

(65) Prior Publication Data

US 2009/0324103 A1    Dec. 31, 2009

(51) Int. Cl.
*G06K 9/62*    (2006.01)
(52) U.S. Cl.
USPC ....... 382/224; 382/115; 382/254; 348/E7.071
(58) Field of Classification Search
CPC .................................. G06K 9/00; G06F 17/30
USPC ..................... 382/224, 254, 115; 348/E7.071
See application file for complete search history.

(56) References Cited

U.S. PATENT DOCUMENTS

| | | |
|---|---|---|
| 6,549,679 B1 | 4/2003 | Zheng |
| 2003/0016865 A1 | 1/2003 | Lopez et al. |
| 2003/0051255 A1 | 3/2003 | Bulman et al. |
| 2003/0164965 A1 | 9/2003 | Enomoto |
| 2004/0174434 A1 | 9/2004 | Walker et al. |
| 2005/0146539 A1 | 7/2005 | Zhu et al. |
| 2006/0045372 A1 | 3/2006 | Wang et al. |
| 2006/0079294 A1* | 4/2006 | Chen .............................. 455/566 |
| 2006/0215930 A1 | 9/2006 | Terui |
| 2006/0245643 A1 | 11/2006 | Bloom et al. |
| 2006/0285762 A1 | 12/2006 | Sun et al. |
| 2007/0110338 A1 | 5/2007 | Snavely et al. |
| 2007/0283235 A1 | 12/2007 | Piper et al. |
| 2008/0120560 A1 | 5/2008 | Cohen et al. |
| 2009/0138290 A1 | 5/2009 | Holden |

OTHER PUBLICATIONS

Agarwala, A. et al., *Interactive Digital Photomontage*, SIGGRAPH-2004, pp. 294-302.
*Tourist Remover*, available at http://www.snapmania.com/info/en/trm/howto.html, dated Oct. 7, 2008, 1 page.
Stauffer, C. et al. *Adaptive Background Mixture Models for Real-Time Tracking*, Proc. of IEEE Computer Society Conference on Computer Vision and Pattern Recognition, 1999, pp. 246-252.
Perez, P. et al., *Poisson Image Editing*, Proceedings of ACM Siggraph 2003, pp. 313-318.
Kumar, R. et al., *Aerial Video Surveillance and Exploitation*, Proceedings of the IEEE, vol. 89, No. 10, Oct. 2001, pp. 1518-1539.
Written Opinion and International Search Report for PCT/FI2009/050407 dated Sep. 18, 2009.

(Continued)

*Primary Examiner* — Ruiping Li
(74) *Attorney, Agent, or Firm* — Alston & Bird LLP

(57) ABSTRACT

A method for providing image modification may include searching an image gallery based on a characteristic of a captured image, determining a correlation between the captured image and a similar image from the image gallery, the similar image sharing the characteristic, and enabling modification of the captured image based on features associated with the similar image that are not visible in the captured image. An apparatus and computer program product corresponding to the method are also provided.

43 Claims, 9 Drawing Sheets

(56) References Cited

OTHER PUBLICATIONS

Agarwala, A. et al., *Interactive Digital Photomontage*, [online][retrieved on Sep. 30, 2013] Retrieved from: <URL: http://grail.cs.washington.edu/projects/photomontage/photomontage.pdf>.

Bornard et al., *Missing Data Correction in Still Images and Image Sequences*, ACM Multimedia (2002).

Criminisi et al., *Object Removal by Exemplar-Based Inpainting*, CVPR (2003).

Griffin, *Mean, Median and Mode Filtering of Images*, Pro. Royal Society London (2000).

Hays et al., *Scene Completion Using Millions of Photographs*, SIGGRAPH (2007).

Simon et al., *Scene Summarization for Large Photo Collections*, ICCV (2007).

Untitled, [online][retrieved Sep. 30, 2013] Retrieved from: <URL: http://www.istockphoto.com/>.

Group Shot, [online][retrieved Sep. 30, 2013] Retrieved from: <URL: http://research.microsoft.com/en-us/projects/groupshot/>.

My Digital Life, [online][retrieved Sep. 30, 2013] Retrieved from: <URL: http://www.mydigitallife.info/2007/01/09/combine-and-merge-photos-to-create-group-composite-image-with-msr-group-shot-free-download/page/2/>.

\* cited by examiner

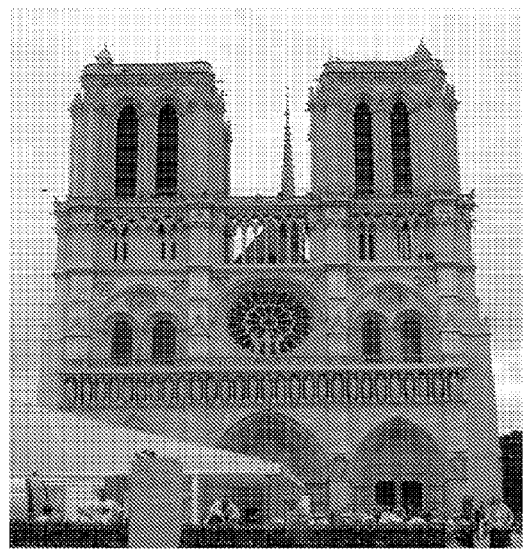
FIG. 4A.
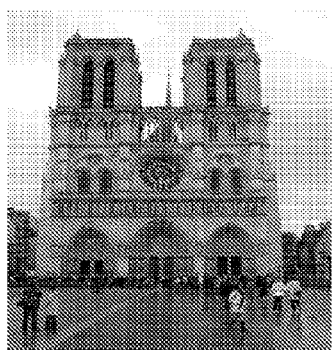 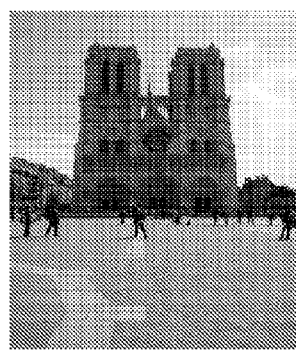 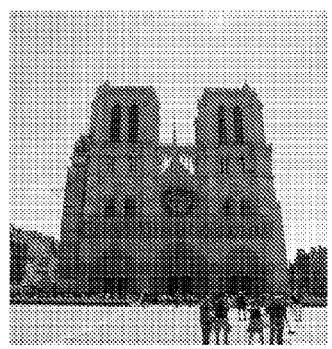
FIG. 4B.  FIG. 4C.  FIG. 4D.

METHOD, APPARATUS AND COMPUTER PROGRAM PRODUCT FOR PROVIDING IMAGE MODIFICATION

TECHNOLOGICAL FIELD

Embodiments of the present invention relate generally to image processing technology and, more particularly, relate to a method, apparatus and computer program product for providing image modification.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

A current trend for mobile terminal producers has been to include cameras on the mobile terminals they produce. Given that mobile terminals are becoming ubiquitous and that many individuals keep their mobile terminals with them much of the time, users are enabled to produce and consume vast amounts of media content such as video, audio, text, image data or the like. Attendant to the increases in mobile terminal capacity for media creation, many services have been created and offered to help individuals manage, share and/or modify their created content.

In relation to the capturing of image data, it is not uncommon that unknown people or undesirable features or objects may be captured in a photo taken at a particular location. For example, a monument or building may be under construction, a blurry image of a passing car may be captured, or certain features may not be in proper focus. Accordingly, it may be desirable to enable users of mobile terminals or other image capturing devices to modify the images they capture.

BRIEF SUMMARY OF SOME EXAMPLES OF THE INVENTION

A method, apparatus and computer program product are therefore provided to enable a user to modify an image by utilizing one or more similar images from a gallery to modify the image based on features from the similar image(s). In this regard, for example, the user may be enabled to erase unwanted objects, alter image features, or perform other modifications. In some embodiments, a similar image or images may be identified for use in image modification on the basis of a shared characteristic or feature with the image to be modified. The similar image or images may be gathered from among a plurality of images in an online gallery or galleries. Options may then be presented to the user to indicate which features of the image may be modifiable or what options for modification may be available. As such, some exemplary embodiments of the invention may provide for relatively robust image modification.

In an exemplary embodiment, a method of providing image modification is provided. The method may include searching an image gallery based on a characteristic of a captured image and determining a correlation between the captured image and a similar image from the image gallery. The similar image may be defined as such based on sharing the characteristic. The method may further include enabling modification of the captured image based on features associated with the similar image that are not visible in the captured image.

In another exemplary embodiment, a computer program product for providing image modification is provided. The computer program product includes at least one computer-readable storage medium having computer-executable program code instructions stored therein. The computer-executable program code instructions may include first, second and third program code instructions. The first program code instruction is for searching an image gallery based on a characteristic of a captured image. The second program code instruction is for determining a correlation between the captured image and a similar image from the image gallery. The similar image may be defined as such based on sharing the characteristic. The third program code instruction is for enabling modification of the captured image based on features associated with the similar image that are not visible in the captured image.

In another exemplary embodiment, an apparatus for providing image modification is provided. The apparatus may include a processor. The processor may be configured to search an image gallery based on a characteristic of a captured image and determine a correlation between the captured image and a similar image from the image gallery. The similar image may be defined as such based on sharing the characteristic. The processor may be further configured to enable modification of the captured image based on features associated with the similar image that are not visible in the captured image.

In yet another exemplary embodiment, an apparatus for providing image modification is provided. The apparatus may include means for searching an image gallery based on a characteristic of a captured image and means for determining a correlation between the captured image and a similar image from the image gallery. The similar image may be defined as such based on sharing the characteristic. The apparatus may further include means for enabling modification of the captured image based on features associated with the similar image that are not visible in the captured image.

Embodiments of the invention may provide a method, apparatus and computer program product for employment, for example, in mobile or fixed environments. As a result, for example, computing device users may enjoy an improved capability for image modification.

BRIEF DESCRIPTION OF THE SEVERAL VIEWS OF THE DRAWING(S)

Having thus described some embodiments of the invention in general terms, reference will now be made to the accompanying drawings, which are not necessarily drawn to scale, and wherein:

DETAILED DESCRIPTION OF SOME EMBODIMENTS OF THE INVENTION

Figure 1:
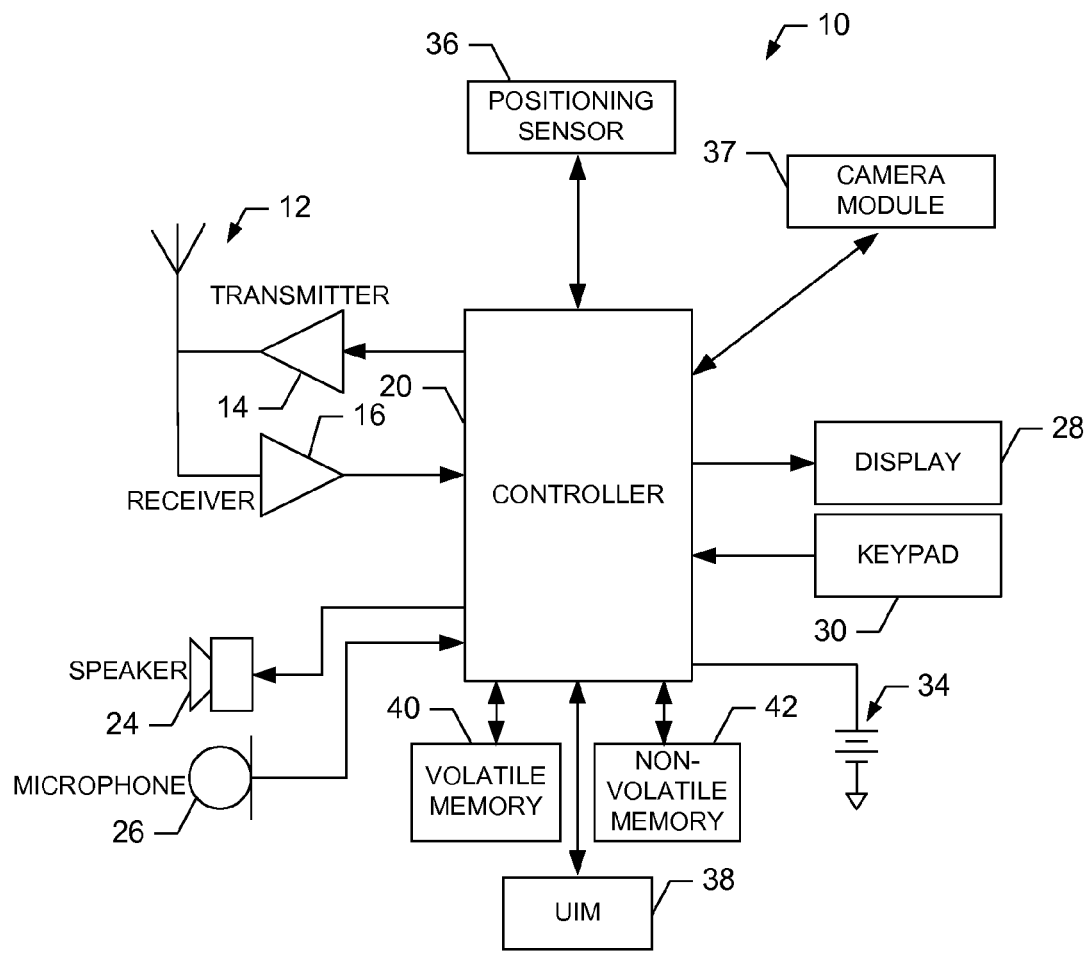
FIG. 1 illustrates a block diagram of a mobile terminal that may benefit from exemplary embodiments of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Some embodiments of the present invention may provide users with the ability to modify an image based on data gathered from another image or other images that may share features or characteristics with the image. Thus, for example, an undesirable object in the foreground or background of the image may be removed (or erased) by replacing pixels related to the undesirable object with pixels from another image that show what is behind the undesirable object. Accordingly, some embodiments may enable presentation of the image without the undesirable object. Embodiments may also enable replacement of other undesirable features from the image, or even the addition of features, based on features included in another image or images. Thus, for example, the background of an image may be expanded to include features that were cropped off in the image being modified. Some embodiments may further present a user with an indication of which features may be erasable based on image data found that shares features with a current image. As yet another alternative, some embodiments may provide the user with an indication of which features may be modified and/or a description of the modifications available for the respective features. As a result, a user of a device such as a mobile terminal may be enabled to have a robust capability for image modification.

An exemplary embodiment of the invention will now be described with reference to FIG. 1, which illustrates a block diagram of a mobile terminal 10 that may benefit from exemplary embodiments of the present invention. It should be understood, however, that a mobile terminal as illustrated and hereinafter described is merely illustrative of one type of mobile terminal that may benefit from some embodiments of the present invention and, therefore, should not be taken to limit the scope of embodiments of the present invention. Several types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications systems, can readily employ embodiments of the present invention.

In addition, while several embodiments of the method of the present invention may be performed or used by or in connection with a mobile terminal 10, the method may be employed by or used in connection with devices other than a mobile terminal (e.g., personal computers (PCs), servers, or the like). Moreover, although the system and method of embodiments of the present invention may be primarily described in conjunction with mobile communications applications, it should be understood that the system and method of embodiments of the present invention can be utilized in conjunction with a variety of other applications, both in the mobile communications industries and outside of the mobile communications industries.

The mobile terminal 10 may include an antenna 12 (or multiple antennas) in operable communication with a transmitter 14 and a receiver 16. The mobile terminal 10 may further include an apparatus, such as a controller 20 or other processing element, that provides signals to and receives signals from the transmitter 14 and receiver 16, respectively. The signals may include signaling information in accordance with the air interface standard of the applicable cellular system, and/or may also include data corresponding to speech, received data and/or user generated/transmitted data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

It is understood that the apparatus, such as the controller 20, may include circuitry for implementing, among others, audio/video and logic functions of the mobile terminal 10. For example, the controller 20 may comprise a digital signal processor device, a microprocessor device, and various analog to digital converters, digital to analog converters, and/or other support circuits. Control and signal processing functions of the mobile terminal 10 are allocated between these devices according to their respective capabilities. The controller 20 thus may also include the functionality to encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional web browser. The connectivity program may then allow the mobile terminal 10 to transmit and receive web content, such as location-based content and/or other web page content, according to a Wireless Application Protocol (WAP), Hypertext Transfer Protocol (HTTP) and/or the like, for example.

The mobile terminal 10 may also comprise a user interface including an output device such as an earphone or speaker 24, a microphone 26, a display 28, and a user input interface, which may be operationally coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include numeric (0-9) and related keys (#, *), and other hard and soft keys used for operating the mobile terminal 10. Alternatively, the keypad 30 may include a QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are used to operate the mobile terminal 10, as well as optionally providing mechanical vibration as a detectable output.

In addition, some embodiments of the mobile terminal 10 may include a positioning sensor 36. The positioning sensor 36 may include, for example, a GPS sensor, an assisted global positioning system (Assisted-GPS) sensor, etc. However, in one exemplary embodiment, the positioning sensor 36 includes a pedometer or inertial sensor. In this regard, the positioning sensor 36 is capable of determining a location of the mobile terminal 10, such as, for example, longitudinal and latitudinal directions of the mobile terminal 10, or a position relative to a reference point such as a destination, start point or point of interest (POI). Information from the positioning sensor 36 may then be communicated to a memory of the mobile terminal 10 or to another memory device to be stored as a position history or location information.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, i.e., cell id identity or cell id information, with which the mobile terminal 10 is in communication. In conjunction with the positioning sensor 36, the cell id information may be used to more accurately determine a location of the mobile terminal 10 in some cases.

In an exemplary embodiment, the mobile terminal 10 may include a media capturing module, such as a camera, video and/or audio module, in communication with the controller 20. The media capturing module may be any means for capturing an image, video and/or audio for storage, display or transmission. For example, in an exemplary embodiment in which the media capturing module is a camera module 37, the camera module 37 may include a digital camera capable of forming a digital image file from a captured image. As such, the camera module 37 may include all hardware, such as a lens or other optical device, and software necessary for creating a digital image file from a captured image. Alternatively, the camera module 37 may include only the hardware needed to view an image, while a memory device of the mobile terminal 10 stores instructions for execution by the controller 20 in the form of software necessary to create a digital image file from a captured image. In an exemplary embodiment, the camera module 37 may further include a processing element such as a co-processor which assists the controller 20 in processing image data and an encoder and/or decoder for compressing and/or decompressing image data. The encoder and/or decoder may encode and/or decode according to a JPEG (Joint Photographic Experts Group) standard format or other formats.

Figure 2:
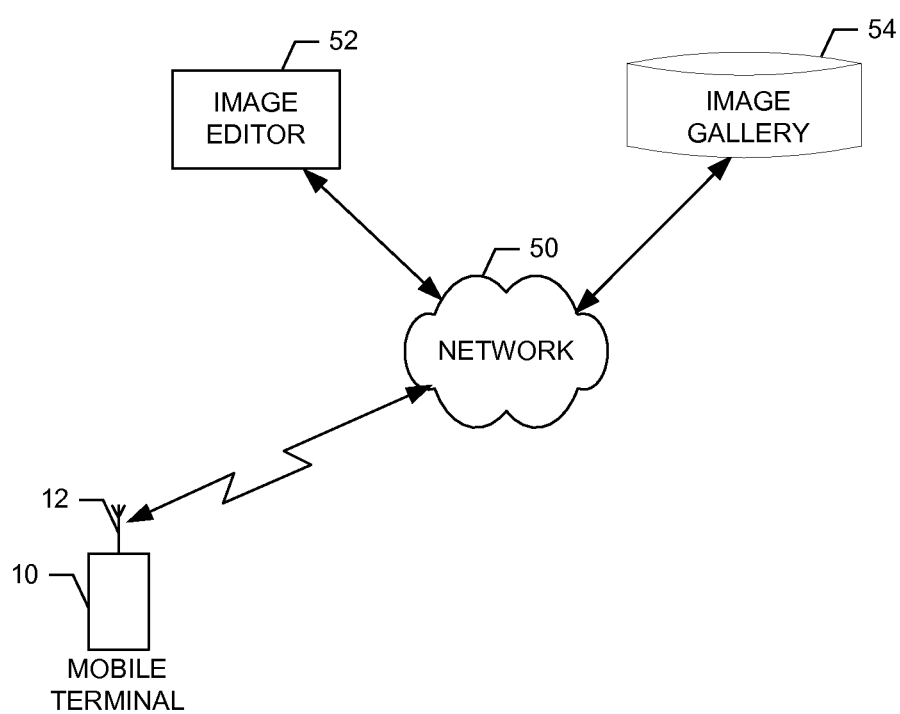
FIG. 2 illustrates a schematic block diagram of a system for providing image modification according to an exemplary embodiment of the present invention.

FIG. 2 is a schematic block diagram of a wireless communications system according to an exemplary embodiment of the present invention. Referring now to FIG. 2, an illustration of one type of system that may benefit from some embodiments of the present invention is provided. As shown, one or more mobile terminals 10 may each include an antenna 12 (or antennas) for transmitting signals to and for receiving signals from a network 50. The network may be a data network such as, for example, a local area network (LAN), a metropolitan area network (MAN), a wide area network (WAN) such as the Internet, and/or the like. As such, devices such as memory repositories and processing elements (e.g., personal computers, server computers or the like) may be coupled to the mobile terminal 10 via the network 50. By directly or indirectly connecting the mobile terminal 10 and other devices to the network 50, the mobile terminal 10 may be enabled to communicate with the other devices and with other mobile terminals, such as according to the Hypertext Transfer Protocol (HTTP) and/or the like, to thereby carry out various functions of the mobile terminal 10.

The network 50 may include or be in communication with an image editor 52 and an image gallery 54. The image gallery 54 may be any storage medium or combination of storage media accessible via the network 50 that may store image files or video files. Thus, for example, the image gallery 54 could be any storage device or database server hosting images, videos or the like. In an exemplary embodiment, the image gallery 54 may be a storage device including a plurality of images that may be sorted or otherwise include information or metadata descriptive of one or more of the respective images stored therein. Thus, for example, images stored in the image gallery may include information or metadata indicative of the subject of the image, a POI associated with the image, a location at which the image was taken, an object or person in the image, and/or the like, and the information or metadata may be used (e.g., based on a query) to identify images from the image gallery 54 that match criteria provided.

The image editor 52 may be any means or device embodied in hardware, software or a combination of hardware and software that is configured to enable image modification of a particular image based on data gathered from other images such as images from the image gallery 52. In this regard, for example, the image editor 52 may take specific direction from the user (e.g., via the mobile terminal 10 and/or the network 50) with respect to desired modifications, or the image editor 52 may be enabled to provide the user with options related to possible modifications that may be selected by the user. Although FIG. 2 shows the image editor 52 as a network device (e.g., a network server or service platform), the image editor 52 could alternatively be embodied at the mobile terminal 10 itself. As yet another alternative, the image editor 52 could be embodied at a combination of devices such as by having a portion of the image editor 52 (e.g., a client application) at the mobile terminal 10 while another portion (e.g., a server application) of the image editor 52 may be embodied at a network server. Similarly, in some embodiments, the image gallery 54 may include portions of memory space that are distributed among devices including the mobile terminal 10, or may be completely contained within the mobile terminal 10, a network device or server (or some other device practicing an embodiment of the present invention). In some embodiments the image gallery 54 may be associated with an Internet service (e.g. Flickr, Facebook, or the like) so that images from the Internet service may be utilized in connection with finding images that may be similar to a query image or an image of interest (e.g., an image captured at the mobile terminal 10).

In an exemplary embodiment, a user of the mobile terminal 10 may capture an image (e.g., via the camera module 37) by taking a picture (or may have taken a picture in the past) and may wish to modify the captured image. Notably, the image could also be a frame within a video sequence. Thus, some embodiments of the present invention may be used for modifying a single still image or one or more images of a video file. The user may submit a request to the image editor 52, for example, to solicit input on possible modifications for the captured image based on image data available in the image gallery 54 or to provide input regarding a desired modification. In some instances, the request may include presentation of the captured image as a query image so that features of the captured image may be used to identify similar images. However, in other embodiments, features or metadata associated with the captured image may form a basis for finding similar images for use in image modification of the captured image. Images that show areas that are occluded or blocked from view in the captured image may be particularly useful as similar images.

In an alternative embodiment, the image editor 52 may operate automatically in response to the taking of the picture or the provision of the captured image by the mobile terminal 10 as long as the image editor 52 is enabled or turned on. Thus, for example, in response to taking a picture or presentation of a captured image to the image editor 52, the image editor may automatically search for similar images and return modification information indicative of changes that may be made to the captured image and/or objects that may be modifiable within the captured image.

In operation according to an exemplary embodiment, the image editor 52 may use a query term provided in the request from the user or may extract metadata about the captured image for use as a query for finding images within the image gallery 54 that may share features with the captured image. In this regard, for example, the image editor 52 may search the image gallery 54 (or provide information to another entity configured to search the image gallery 54) for images that were taken of the same subject, at the same location, at the same time or time of day, of the same POI, etc., on the basis of information or metadata describing each image in the image gallery 54, which may in some cases include image recognition techniques such as optical character recognition (OCR) or other techniques.

After a similar image or images (e.g., images taken at the same location, of the same subject or POI, etc.) have been located, the image editor 52 may be configured to compare features of the captured image and the similar image or images to determine, for example, permanent or salient features of the captured image and features that are not permanent or are likely to be removal or erasure candidates. In this regard, for example, an image of a well known landmark may be the subject of a plurality of photos in the image gallery 54. A captured image of the landmark may include a family member posing in front of the landmark and one or more other individuals passing by in the foreground. The image editor 52 may be enabled to recognize the captured image as a picture of the landmark (e.g., via metadata) and locate similar images in the image gallery 54 (e.g., via metadata or image matching) for comparison to the captured image. Upon comparing the similar images to the captured image, the image editor 52 may determine that the landmark itself comprises a permanent feature or feature set, while the portions of the image that relate to the family member and the other individuals are not permanent (e.g., since they do not appear in any or at least a significant number of the similar images). The image editor 52 may then enable the user to erase or remove the not permanent features by replacing pixels corresponding to the not permanent features by image data from one or more of the similar images. In some cases, the image editor 52 may present the captured image to the user with an indication of which features are removable or erasable or with options regarding image modifications that may be made.

In an exemplary embodiment, content or data may be communicated over the system of FIG. 2 between a mobile terminal, which may be similar to the mobile terminal 10 of FIG. 1, and a network device of the system of FIG. 2 in order to, for example, execute applications or establish communication (for example, for purposes of content, data or information sharing) between the mobile terminal 10 and other mobile terminals or network devices. As such, it should be understood that the system of FIG. 2 need not be employed for communication between mobile terminals or between a network device and the mobile terminal, but rather FIG. 2 is merely provided for purposes of example. Furthermore, it should be understood that embodiments of the present invention may be resident on a communication device such as the mobile terminal 10, and/or may be resident on a mobile telephone, mobile computer, gaming device, camera, server, network device, personal computer or other device, with or without any communication via the system of FIG. 2.

An exemplary embodiment of the invention will now be described with reference to FIG. 3, in which certain elements of an apparatus for providing image modification are displayed. The apparatus of FIG. 3 may be employed, for example, on the mobile terminal 10 of FIG. 1 (e.g., if the image editor 52 is embodied at the mobile terminal 10) or at a network or other device (e.g., if the image editor 52 is embodied at a device other than the mobile terminal 10). However, it should be noted that the system of FIG. 3, may also be employed on a variety of other devices, both mobile and fixed, and therefore, the present invention should not be limited to application on devices such as the mobile terminal 10 of FIG. 1 or a device of FIG. 2. Alternatively, embodiments may be employed on a combination of devices including, for example, those listed above. Accordingly, embodiments of the present invention may be embodied wholly at a single device (e.g., the mobile terminal 10) or by devices in a client/server relationship. Furthermore, it should be noted that the devices or elements described below may not be mandatory and thus some may be omitted in certain embodiments.

Figure 3:
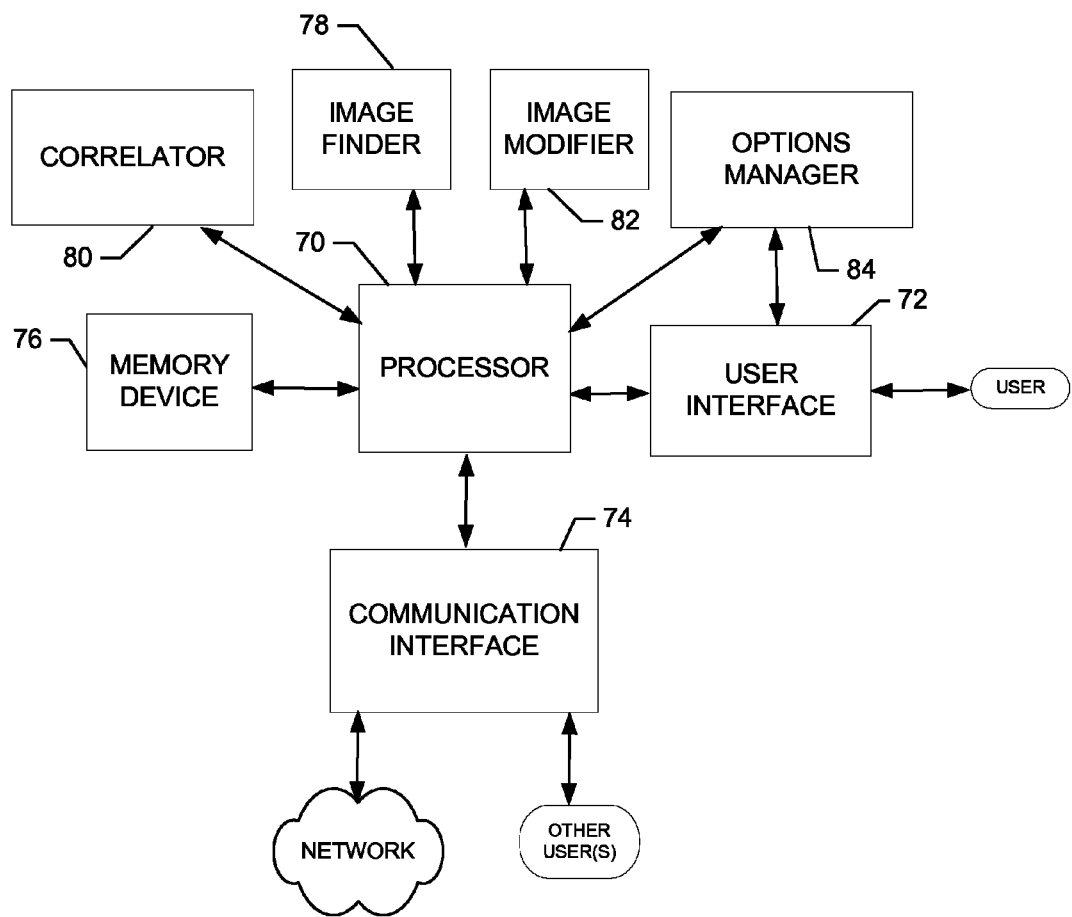
FIG. 3 illustrates a schematic block diagram of an apparatus for providing image modification according to an exemplary embodiment of the present invention.

Referring now to FIG. 3, an apparatus for providing image modification (e.g., the image editor 52) is provided. The apparatus may include or otherwise be in communication with a processor 70, a user interface 72, a communication interface 74 and a memory device 76. The memory device 76 may include, for example, volatile and/or non-volatile memory. The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In fixed environments, the communication interface 74 may alternatively or also support wired communication. As such, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen interface, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a mobile terminal (e.g., the mobile terminal 10), the user interface 72 may include, among other devices or elements, any or all of a speaker, a microphone, a display, and a keyboard or the like.

In an exemplary embodiment, the processor 70 may be embodied as, include or otherwise control an image finder 78, a correlator 80, an image modifier 82, and an options manager 84. The image finder 78, the correlator 80, the image modifier 82, and the options manager 84 may each be any means such as a device or circuitry embodied in hardware, software or a combination of hardware and software that is configured to perform the corresponding functions of the image finder 78, the correlator 80, the image modifier 82, and the options manager 84, respectively, as described below. In an exemplary embodiment, the image finder 78, the correlator 80, and/or the image modifier 82 may be in communication with a media capturing module (e.g., the camera module 37 of FIG. 1) to receive image data for use in analysis as described below. Furthermore, the image finder 78 may be in communication with the positioning sensor 36 to receive location information indicative of where a particular image was captured. However, such information may also be gathered via metadata or other sources.

The image finder 78 may be configured to access (e.g., via the network 50) a collection of images (e.g., via the image gallery 54) to determine whether one or more of the images in the collection of images may be similar to a captured image. In this regard, for example, the image finder 78 may be configured to extract feature data and/or metadata from the captured image in order to compare the feature data and/or the metadata to that of images in the collection of images to enable an identification of similar images. As such, a characteristic of the captured image (e.g., the location or subject of the captured image) may serve as the basis for a search for similar images (e.g., images sharing the characteristic). In some embodiments, contrary to conventional image modification methods that use photos taken within a burst of photos taken by the same user, or images otherwise selected and provided by the user, the image finder 78 may be enabled to conduct a search (e.g., an online search) for similar images. Thus, the user need not actually provide or even be aware of the existence of similar images as the image finder 78 may find such images if they exist in an accessible location. In an exemplary embodiment, the user may provide an indication of what criteria should be used for finding similar images (e.g., location match, metadata (tag) match, group match, content match or the like). However, preferences, settings and/or information availability may alternatively be factors for guiding the image finder 78 in relation to finding similar images.

Figure 4E:
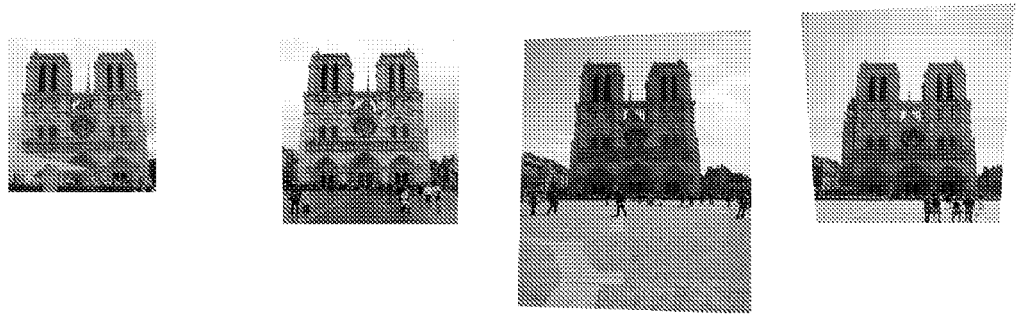
FIG. 4 (including FIGS. 4A-4F) shows various stages of processing for image modification according to an exemplary embodiment of the present invention.
Figure 4F:
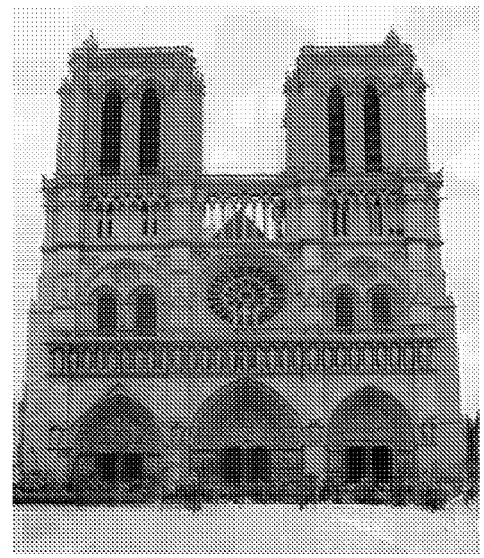

In an exemplary embodiment, the image finder 78 may be configured to identify a similar image based on sharing metadata or other feature data with the captured image. FIG. 4, which includes FIGS. 4A-4F, shows various stages of processing for image modification according to an exemplary embodiment. Thus, for example, as shown in FIG. 4A, a captured image of Notre Dame Cathedral in Paris may be received or generated. The captured image may include metadata indicative of information indicating the location at which the captured image was taken (e.g., GPS coordinates). The captured image may also include not only the cathedral itself, but may also include other features. In this regard, as shown in FIG. 4A, a tent and tourists associated with a special event may be in the foreground thereby preventing a clear view of the cathedral. The image finder 78 may be configured to utilize the information indicative of the location at which the captured image was taken to find other candidate images (e.g., the images of FIGS. 4B, 4C, and 4D, respectively) that are considered similar due to having been taken at the same location or of the same subject. In some instances, the image finder 78 may be configured to do image analysis also since an image sharing the same GPS coordinates could be a view from Notre Dame instead of a view of Notre Dame. In alternative embodiments, the image analysis may be done by the correlator 80. As such, the image finder 78 (or correlator 80) may be configured to analyze the image data itself to ensure the same object or subject is photographed in images considered to be similar (e.g., via feature comparison). In some cases, only a particular number of similar images may be utilized for image modification, in which case the images selected to be included in the particular number of images may be selected based on a degree of similarity or may be selected based on the frequency of usage of such images by other users of a modification service. The similar images may then be communicated or identified to the correlator 80 for further processing.

The correlator 80 may be configured to correlate images to enable the removal of a portion of one image and replacement of the removed portion with a corresponding portion or portions from one or more of the similar images. In this regard, for example, pixels associated with an object that appears in a captured image, but does not appear in one or more of the similar images may be replaced by the possibly modified pixels of the one or more similar images to affect removal or erasure of the object in the captured image. Thus, for example, features behind an obstructing object in the captured image may be provided by the similar image or images. In some cases, the correlator 80 may initially perform an image alignment so that, for example, the main object (e.g., the Notre Dame Cathedral) in each image is of roughly the same scale in each image as shown, for example, in FIG. 4E. After image alignment, correlating regions may be identified on the basis of features that are common to one or more of the images and objects that are in the foreground or background of less than all of the images may be identified as removable or erasable objects.

In situations where a plurality of images have the same metadata (e.g., GPS coordinates), the usage of image alignment techniques by the correlator 80 may be useful in identifying images suitable for consideration as similar images. For example, the image finder 78 may find images having similar metadata, while the correlator 80 may eliminate images that cannot be aligned or do not align well from consideration as similar images. Thus, for example, the correlator 80 may also enable the elimination of images that, although they were taken at the same location or of the same object, do not correlate (e.g., an image taken of the back of Notre Dame Cathedral may not correlate to an image of the front). The image alignment performed by the correlator 80 may also identify regions of the captured image (e.g., objects in the captured image) that do not correlate with the similar images, thereby identifying areas that may be candidates for modification. Thus, the correlator 80 may both correlate images to determine similar images and correlate features within the images to determine which features may be modified in a captured image.

In exemplary embodiments, options may be provided to the user (e.g., via the options manager 84) regarding the identified regions. Moreover, the region or regions (or objects) of the captured image that are determined to lack correlation with the similar image or images may be operated on by the image modifier 82 (e.g., automatically or in response to a selection received from the options manager 84) to modify the captured image. The correlator 80 may be configured to identify objects or features that are modifiable (e.g., modification candidates) to the image modifier 82 and/or the options manager 84 to enable the modification of identified objects or features either automatically or based on user input.

The image modifier 82 may be configured to modify the captured image to produce an edited or composite image based on modifications enabled by data provided from the similar image(s). In this regard, for example, the image modifier 82 may be configured to do pixel replacement in a region identified as being capable of being modified and/or in a region identified by the user (e.g., via the options manager 84). A smoothing algorithm or other technique may also be employed to reduce differences between the captured image and the replaced pixels, especially at the edges of regions being replaced. Alternatively, gradient information from a portion of a similar image that will be used to replace a portion of the captured image may be applied to obtain pixel values for use in the composite image by integration (e.g., Poisson image editing). In an exemplary embodiment, for example, after the captured image has undergone correlation with respect to similar images, portions of the captured image that do not correlate to features of the similar images may be eligible for modification. The image modifier 82 may be further configured to indicate to the user those features or objects within the captured image that do not correlate to features or objects in the similar images and therefore could be erased, replaced or otherwise modified. In some cases, the objects or features that could be modified (e.g., modification candidates) may be identified by being highlighted with a shaded border, a shaded object superimposed thereon, a color modification (e.g., black and white), an overlay object, or another graphical form of identification or distinction.

The image modifier 82 may be configured to also enable the addition of certain features to the captured image in some cases. For example, if one or more of the similar images includes an extended view of background areas and/or foreground areas, the image data corresponding to the background and/or foreground areas may be added to the captured image. FIG. 4F shows an example in which the captured image of FIG. 4A has been modified by the image modifier 82 to eliminate several foreground objects and also expand the background. Thus, embodiments of the present invention may enable image modification (e.g., via the image modifier 82) via the extraction of image features or objects and/or via the expansion or extension of image size or scope, for example, by providing additional background information to the image.

The options manager 84 may be configured to provide information for display to the user (e.g., via the user interface 72 or, if the apparatus is embodied at a server, via the communication interface 74) that may be indicative of modifications that may be made to the captured image. The options manager 84 may also be configured to communicate user input or feedback received relative to options for modification to the image modifier 82 for use by the image modifier 82 in producing a modified or composite image. As indicated above, the options manager 84 may take information indicative of modification candidates for presentation to the user in a selectable format. Thus, for example, one or more highlighted objects or features may be presented to the user and the highlighted object(s) or feature(s) may be removed or erased (e.g., by pixel replacement as described above) or may be added (e.g., by background expansion via the addition of pixels corresponding to a background region) in response to user selection of a respective highlighted object or feature. Alternatively, a control console, pop up control panel or other dialog box may be presented to the user by the options manager 84 and options may be selected therefrom to enable the image modifier 82 to produce a composite image based on the selected options.

Figure 5A:
FIG. 5 (including FIGS. 5A-5D) shows another example of an image modification in accordance with an exemplary embodiment of the present invention.
Figure 5B:
Figure 5C:
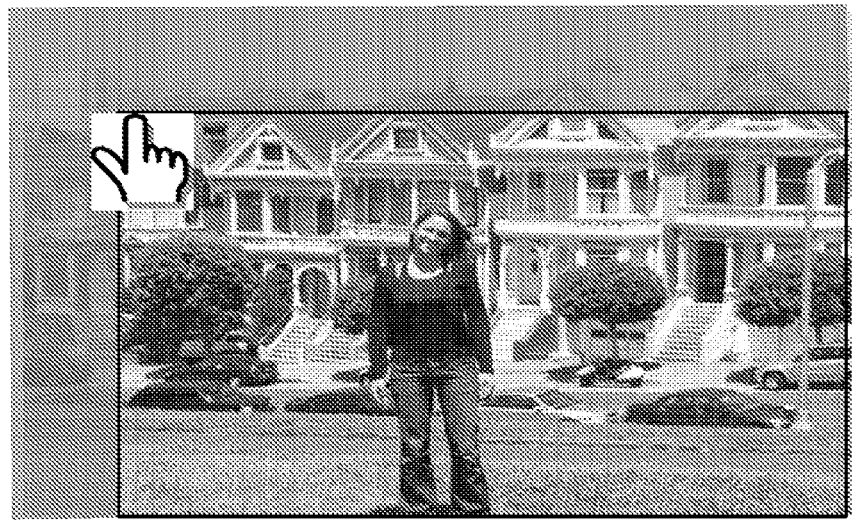
Figure 5D:
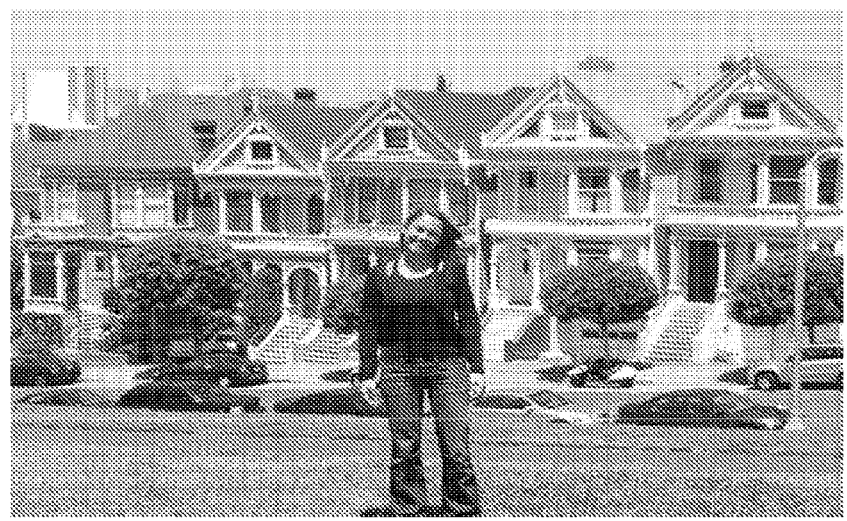

FIG. 5, which includes FIGS. 5A-5D, shows another example of an image modification in accordance with an exemplary embodiment. In this regard, an exemplary captured image is shown in FIG. 5A. FIG. 5B illustrates an example of a display that may be provided to the user to indicate features with respect to which modifications that are available (e.g., modification candidates 90 and 92). As shown in FIG. 5B, after comparison of the captured image to similar images, the options manager 84 has provided the user with an indication that additional background information (e.g., as shown by addition candidate 90) may be added and that one of the cars may be removed (e.g., as shown by erasure candidate 92). Candidates for erasure and addition may be indicated in different ways such as by color difference or other distinguishing characteristics. In response to selection, for example, of the additional background information for inclusion (e.g., as shown in FIG. 5C), a composite image including the captured image as modified by the similar images may be presented (e.g., as shown in FIG. 5D).

Figure 6:
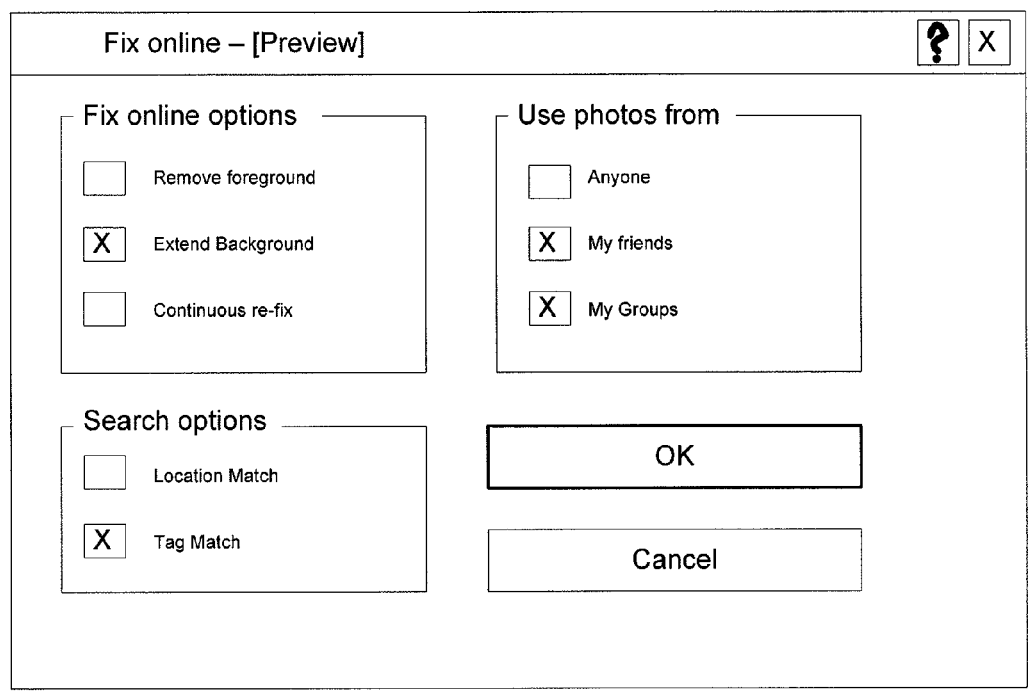
FIG. 6 illustrates a dialog box according to an exemplary embodiment of the present invention.

FIG. 6 illustrates an exemplary embodiment of a control console or dialog box that may be presented by the options manager 84 according to an exemplary embodiment. However, other configurations and styles for a dialog box to receive user input may alternatively be presented. As shown in FIG. 6, as an alternative or addition to the graphical indications shown in FIG. 5 for alerting the user as to which features or objects may be added or removed from an image on the basis of data available in similar images, the control console may be provided to give options for providing search guidelines, providing an indication of available modification options, and/or providing a mechanism by which a user may select from available options.

In this regard, as shown in FIG. 6, the user may be provided with an opportunity to select between location match, content match and/or tag match as search guidelines. If location match only is selected, similar images may be selected from images taken at the same location as the captured image within a predefined distance. If tag match only is selected, similar images may be selected from images taken that share metadata with the captured image. Both selections may alternatively be made, or even additional options may be selected. In some embodiments, the options offered may be variable and indicative of options determined to be available for a particular image.

In some embodiments, the user may define the search space for use by the image finder 78. As such, for example, the user may (e.g., via the options manager 84) designate particular locations, services, or classes of people (e.g., friends, anyone, etc.) from which image data may be accessed in search of similar images with respect to a candidate image. In other words, the user may define the search scope within the image gallery 54. The search scope may be limited, for example, based on the provider of the photo, the physical location of the photo, a ranking or frequency of usage of the photo, the service with which the photo is associated, the availability of the photo (e.g., the photo taker has offered the photo up for use by group members or service users), and/or the like.

In some embodiments, the user may also define which modification options are to be accepted and/or which modification options the user is interested in being presented. Thus, for example, if various options for modification are available and presented via the control console, the user may select which options should be employed for creation of a composite image. Alternatively, the user may indicate which options are desirable for consideration so that, for example, the correlator 80 may focus correlation efforts on the areas and/or tasks that may be desired (e.g., background extension, foreground object erasure, continuous re-fixing, etc.). Continuous re-fixing may involve re-examination of fixed files in relation to new similar files becoming available so that if a previously obstructed portion of an image may later be fixed based on a newly available similar image, the image editor 52 may re-fix the image based on the newly available similar image automatically when the newly available similar image is recognized. In some cases, images that could not be fixed previously due to a lack of corresponding information in the image gallery 54 may receive an "unfixed" tag and only unfixed images may be considered for re-fixing. Furthermore, the user may, in some instances, provide an indication of a desire to be notified if opportunities arise to fix an unfixed image or re-fix a fixed image.

Thus, since some embodiments of the present invention may enable the user to select and define parameters for conducting image modification using an online image collection, the control console may be a mechanism by which the user may be apprised of available online fix options and/or may provide parameters to guide online fix operations. This may be considered a guided fix mode in which the user may provide guidance regarding image selection (e.g., where to look and for what to look), which features or types of features to correct or consider for correction, etc. Alternatively, an auto-fix mode may also be available. In the auto-fix mode, the image editor 52 may automatically correct, erase, add or otherwise modify image features that may be modifiable. In some cases, a composite image may be presented to the user that represents a final version of the modified captured image. However, in other cases, the composite image may be presented with an overlay or other indicator showing which features or objects were removed to enable the user to select such features or objects for either continued exclusion or restoration for inclusion in the composite image.

As indicated above, embodiments of the present invention may not only apply to object removal or addition. As such, for example, other features such as lighting, resolution, red-eye, glare, and/or the like, may also or alternatively be modified or corrected by embodiments of the present invention. In this regard, for example, the user may specify areas of an image in which modification may be desired, or areas that may be modified may also be analyzed in other images being examined for similarity to enable the provision of information about the availability of fixing such options to the user.

Some embodiments of the present invention may enable users to extend photos to include data that was not there when the original photo was taken and/or to eliminate obstructions that were there when the original photo was taken. Some embodiments may also enable relatively simple and intuitive mechanisms for identifying and/or initiating image modifications without requiring the user to specify features desired for modification. Rather, for example, the user may be made aware of objects that can be changed. Pixels belonging either to objects that are to be removed or retained may be grouped together so that the user need not outline such objects with a cursor or other user interface device. Additionally, some embodiments may leverage online image collections in a service based environment that may enable continuous image improvement as availability for such improvement arises.

In some exemplary embodiments, the options manager 84 may be further configured to provide an indication to the user regarding the availability of images or image data for use in improving a captured image (e.g., images with the same or similar location, tag or content). For example, if a service associated with collecting, storing, or presenting images (e.g., Flickr, Facebook, etc.) receives new images that may correlate to a captured image of a user, the options manager 84 may present an icon, link or other indication to the user to inform the user that image data may be available for use in fixing or re-fixing the captured image. In some cases, by selecting the icon, link or other indication, the user may be provided with a view of a composite image based on data associated with the newly available image or images as described above.

Figure 7:
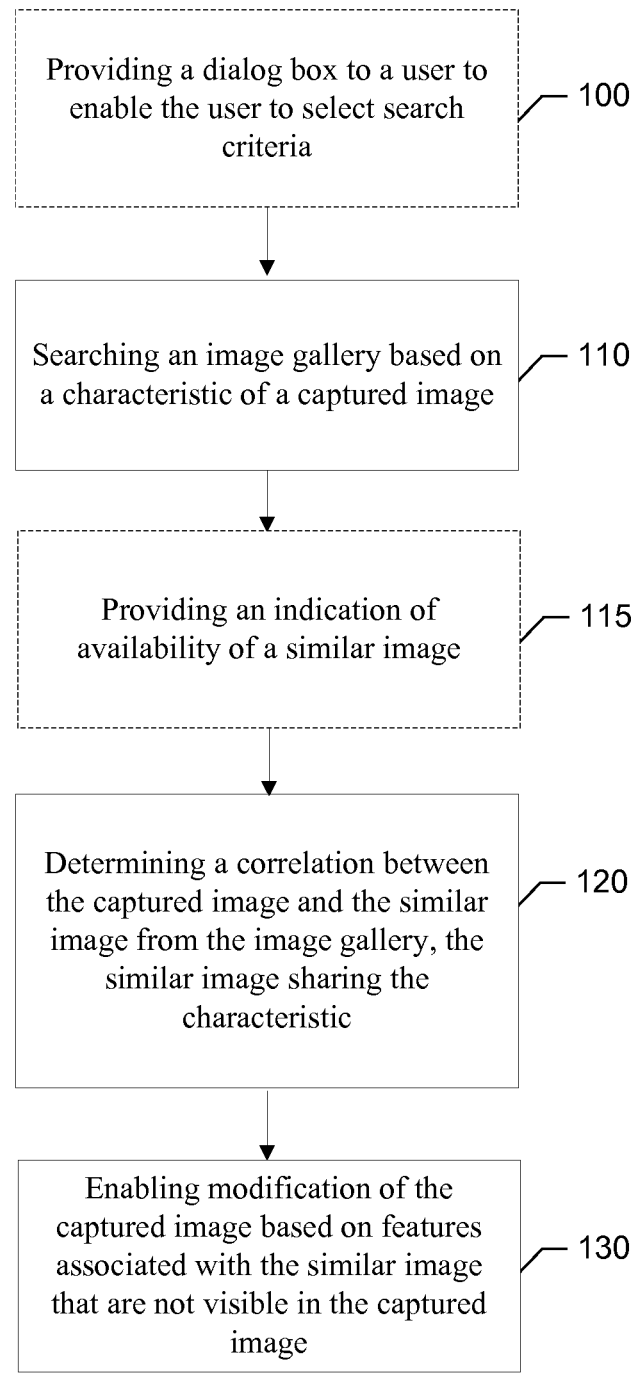
FIG. 7 is a flowchart according to an exemplary method for providing image modification according to an exemplary embodiment of the present invention.

FIG. 7 is a flowchart of a system, method and program product according to some exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal or other apparatus employing embodiments of the present invention and executed by a processor in the mobile terminal or other apparatus. As will be appreciated, any such computer program instructions may be loaded onto a computer or other programmable apparatus (i.e., hardware) to produce a machine, such that the instructions which execute on the computer (e.g., via a processor) or other programmable apparatus create means for implementing the functions specified in the flowchart block(s) or step(s). These computer program instructions may also be stored in a computer-readable memory that can direct a computer (e.g., the processor or another computing device) or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing image modification as illustrated, for example, in FIG. 7 may include searching an image gallery based on a characteristic of a captured image at operation 110. The method may further include determining a correlation between the captured image and a similar image from the image gallery at operation 120. The similar image may be defined as such based on sharing the characteristic. The method may also include enabling modification of the captured image based on features associated with the similar image that are not visible in the captured image at operation 130.

In an exemplary embodiment, the method may include further optional operations as well, some examples of which are shown in FIG. 7 in dashed lines. In this regard, exemplary additional operations may include optional operation 100 of providing a dialog box to a user to enable the user to select search criteria. The search criteria may define a basis on which to select an image as the similar image or define an allowable source associated with the image gallery from which to search for the similar image. In an alternative embodiment, the method may further include an optional operation 115 of providing an indication of availability of the similar image. Thus, for example, if an image or images that are similar to the captured image based on content, tag or location, an icon, link or other indicia may be presented to the user to inform the user of the availability of the image or images for fixing or even re-fixing the captured image.

In some exemplary embodiments, searching the image gallery based on the characteristic may include searching the image gallery based on metadata indicative of a subject of the captured image or searching the image gallery based on information indicative of a location of the captured image. In some embodiments, determining the correlation may include aligning the similar image and the captured image.

In an exemplary embodiment, enabling modification may include providing an indication of an erasable feature in the captured image. In this regard, in some cases, providing the indication of the erasable feature in the captured image may include providing for display of the erasable feature in a distinctive manner relative to other features of the captured image. Enabling modification may also or alternatively include providing an indication of an additional feature that may be added to the captured image based on data shown in the similar image that is not included in the captured image or enabling selection of an option for automatic updating of modification of the captured image in response to a future addition of an image sharing the characteristic to the image gallery. In some situations, enabling modification may include providing for a display of a composite image showing the captured image as modified based on pixel replacement for modification candidates in the captured image with pixels from a corresponding location in the similar image.

In an exemplary embodiment, an apparatus for performing the method of FIG. 7 above may comprise a processor (e.g., the processor 70) configured to perform some or each of the operations (100-130) described above. The processor may, for example, be configured to perform the operations (100-130) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-130 may comprise, for example, the processor 70, respective ones of the image finder 78, the correlator 80, the image modifier 82, and the options manager 84, or an algorithm executed by the processor for controlling the selection of similar images, correlation of images and features therein, and enabling image modification based on the correlation of the images as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   detecting at least one erasable feature in a foreground of a captured image;
   searching an image gallery based on a characteristic of the captured image, wherein the image gallery comprises a plurality of images;
   determining, using a processor, a correlation between the captured image and a similar image from the image gallery, the similar image sharing the characteristic;
   causing the captured image to be modified by erasing the at least one erasable feature associated with the captured image, wherein the at least one erasable feature is not visible in the similar image; and
   causing a composite image to be displayed, the composite image comprising the captured image having the erased feature in the foreground replaced with pixels from a corresponding location in the similar image, wherein the pixels from the corresponding location in the similar image are background pixels that were blocked in the captured image by the at least one erasable feature in the foreground.

2. The method of claim 1, further comprising causing an indication of an erasable feature to be displayed in the captured image.

3. The method of claim 2, further comprising causing the erasable feature to be displayed in a distinctive manner relative to other features of the captured image.

4. The method of claim 1, further comprising causing an indication of an additional feature that is configured to be added to the captured image to be displayed based on data shown in the similar image that is not included in the captured image.

5. The method of claim 1, further comprising receiving an indication of search criteria defining a basis on which to select an image as the similar image.

6. The method of claim 1, further comprising receiving search criteria defining an allowable source associated with the image gallery from which to search for the similar image.

7. The method of claim 1, further comprising receiving an indication of a selection of an option for automatic updating of modification of the captured image in response to a future addition of an image sharing the characteristic to the image gallery.

8. The method of claim 1, wherein determining the correlation comprises aligning the similar image and the captured image.

9. The method of claim 1, wherein searching the image gallery based on the characteristic comprises searching the image gallery based on metadata indicative of a subject of the captured image.

10. The method of claim 1, wherein searching the image gallery based on the characteristic comprises searching the image gallery based on information indicative of a location of the captured image.

11. The method of claim 1, further comprising causing an indication of availability of the similar image to be provided.

12. An apparatus comprising:
    a processor; and
    a memory including computer program code, the memory and the computer program code configured to, with the processor, cause the apparatus to at least:
    detect at least one erasable feature in a foreground of a captured image;
    search an image gallery based on a characteristic of a captured image, wherein the image gallery comprises a plurality of images;
    determine a correlation between the captured image and a similar image from the image gallery, the similar image sharing the characteristic;
    cause the captured image to be modified by erasing the at least one erasable feature associated with the captured image, wherein the at least one erasable feature is not visible in the similar image; and
    cause a composite image to be displayed, the composite image comprising the captured image having the erased feature in the foreground replaced with pixels from a corresponding location in the similar image, wherein the pixels from the corresponding location in the similar image are background pixels that were blocked in the captured image by the at least one erasable feature in the foreground.

13. The apparatus of claim 12, wherein the memory including the computer program code is further configured to, with the processor, cause the apparatus to cause an indication of an erasable feature to be displayed in the captured image.

14. The apparatus of claim 13, wherein the memory including the computer program code is further configured to, with the processor, cause the apparatus to cause the erasable feature to be displayed in a distinctive manner relative to other features of the captured image.

15. The apparatus of claim 12, wherein the memory including the computer program code is further configured to, with the processor, cause the apparatus to cause an indication of an additional feature to be displayed that may be added to the captured image based on data shown in the similar image that is not included in the captured image.

16. The apparatus of claim 12, wherein the memory including the computer program code is further configured to, with the processor, cause the apparatus to receive an indication of search criteria that defines a basis on which to select an image as the similar image.

17. The apparatus of claim 12, wherein the memory including the computer program code is further configured to, with the processor, cause the apparatus to receive search criteria defining an allowable source associated with the image gallery from which to search for the similar image.

18. The apparatus of claim 12, wherein the memory including the computer program code is further configured to, with the processor, cause the apparatus to receive an indication of a selection of an option for automatic updating of modification of the captured image in response to a future addition of an image sharing the characteristic to the image gallery.

19. The apparatus of claim 12, wherein the memory including the computer program code is further configured to, with the processor, cause the apparatus to determine the correlation by aligning the similar image and the captured image.

20. The apparatus of claim 12, wherein the memory including the computer program code is further configured to, with the processor, cause the apparatus to search the image gallery based on the characteristic by searching the image gallery based on metadata indicative of a subject of the captured image.

21. The apparatus of claim 12, wherein the memory including the computer program code is further configured to, with the processor, cause the apparatus to search the image gallery based on the characteristic by searching the image gallery based on information indicative of a location of the captured image.

22. The apparatus of claim 12, wherein the memory including the computer program code is further configured to, with the processor, cause the apparatus to cause an indication of availability of the similar image to be displayed.

23. A computer program product comprising at least one computer-readable non-transitory storage medium having computer-executable program code instructions stored therein, the computer-executable program code instructions comprising:
    first program code instructions for detecting at least one erasable feature in a foreground of a captured image;
    second program code instructions for searching an image gallery based on a characteristic of a captured image, wherein the image gallery comprises a plurality of images;
    third program code instructions for determining a correlation between the captured image and a similar image from the image gallery, the similar image sharing the characteristic;
    fourth program code instructions for causing the captured image to be modified by erasing the at least one erasable feature associated with the captured image, wherein the at least one erasable feature is not visible in the similar image; and
    fifth program code instructions for causing a composite image to be displayed, the composite image comprising the captured image having the erased feature in the foreground replaced with pixels from a corresponding location in the similar image, wherein the pixels from the corresponding location in the similar image are background pixels that were blocked in the captured image by the at least one erasable feature in the foreground.

24. The computer program product of claim 23, wherein the fourth program instructions include instructions for causing an indication of an erasable feature to be displayed in the captured image.

25. The computer program product of claim 24, wherein the fourth program instructions include instructions for causing the erasable feature to be displayed in a distinctive manner relative to other features of the captured image.

26. The computer program product of claim 23, wherein the fourth program instructions include instructions for causing an indication of an additional feature to be displayed that may be added to the captured image based on data shown in the similar image that is not included in the captured image.

27. The computer program product of claim 23, further comprising sixth program code instructions for causing a dialog box to be displayed; and receiving search criteria defining a basis on which to select an image as the similar image based on a user interaction with the dialog box.

28. The computer program product of claim 23, wherein the fourth program instructions include instructions for causing an option for automatic updating of modification of the captured image to be displayed in response to a future addition of an image sharing the characteristic to the image gallery.

29. The computer program product of claim 23, wherein the third program instructions include instructions for aligning the similar image and the captured image.

30. The computer program product of claim 23, further comprising sixth program code instructions for causing an indication of availability of the similar image to be displayed.

31. An apparatus comprising:
    means for detecting at least one erasable feature in a foreground of a captured image;
    means for searching an image gallery based on a characteristic of a captured image, wherein the image gallery comprises a plurality of images;
    means for determining a correlation between the captured image and a similar image from the image gallery, the similar image sharing the characteristic;
    means for causing the captured image to be modified by erasing the at least one erasable feature associated with the captured image, wherein the at least one erasable feature is not visible in the similar image; and
    means for causing a composite image to be displayed, the composite image comprising the captured image having the erased feature in the foreground replaced with pixels from a corresponding location in the similar image, wherein the pixels from the corresponding location in the similar image are background pixels that were blocked in the captured image by the at least one erasable feature in the foreground.

32. The apparatus of claim 21, further comprising means for receiving search criteria.

33. A system comprising:
    a mobile terminal configured to cause the transmission of one or more captured images and cause a composite image to be displayed; and
    a network device configured to receive the one or more captured images and generate the composite image, the network device comprising a processor and a memory including computer program code, the memory and the computer program code configured to, with the processor, cause the network device to at least:
    detect at least one erasable feature in a foreground of a captured image of the one or more captured images;
    search an image gallery based on a characteristic of the captured image, wherein the image gallery comprises a plurality of images;
    determine a correlation between the captured image and a similar image from the image gallery, the similar image sharing the characteristic;
    cause the captured image to be modified by erasing the at least one erasable feature associated with the captured image, wherein the at least one erasable feature is not visible in the similar image; and
    generate the composite image that is displayable on the mobile terminal, the composite image comprising the captured image having the erased feature in the foreground replaced with pixels from a corresponding location in the similar image, wherein the pixels from the corresponding location in the similar image are background pixels that were blocked in the captured image by the at least one erasable feature in the foreground.

34. The system of claim 33, wherein the memory and the computer program code is further configured to, with the processor, cause the network device to at least identify an erasable feature in the captured image and cause an indication of the erasable feature to be displayed on the mobile terminal.

35. The system of claim 33, wherein the image gallery comprises the one or more captured images.

36. The system of claim 33, wherein the memory and the computer program code is further configured to, with the processor, cause the network device to at least identify an additional feature that is to be added to the captured image based on data shown in the similar image that is not included in the captured image and cause an indication of the erasable feature to be displayed on the mobile terminal.

37. The system of claim 33, wherein the mobile terminal is further configured to receive a request to generate the composite image.

38. The system of claim 33, wherein the memory and the computer program code is further configured to, with the processor, cause the network device to at least receive search criteria from the mobile terminal defining one or more allowable sources associated with the image gallery from which to search for the similar image.

39. The system of claim 33, wherein the memory and the computer program code is further configured to, with the processor, cause the network device to at least receive an indication from the mobile terminal of a selection of an option for automatic updating of modification of the captured image in response to a future addition of an image sharing the characteristic to the image gallery.

40. The system of claim 33, wherein the memory and the computer program code is further configured to, with the processor, cause the network device to at least align the similar image and the captured image to determine the correlation.

41. The system of claim 33, wherein the memory and the computer program code is further configured to, with the processor, cause the network device to at least search the image gallery based on metadata indicative of a subject of the captured image.

42. The system of claim 33, wherein the memory and the computer program code is further configured to, with the processor, cause the network device to at least search the image gallery based on the characteristic that comprises searching the image gallery based on information indicative of a location of the captured image.

43. The system of claim 33, wherein the memory and the computer program code is further configured to, with the processor, cause the network device to at least identify an availability of the similar image to be provided and cause an indication of the availability of the similar image to be displayed on the mobile terminal.

* * * * *

UNITED STATES PATENT AND TRADEMARK OFFICE
CERTIFICATE OF CORRECTION

PATENT NO.        : 8,768,070 B2                                  Page 1 of 1
APPLICATION NO.   : 12/147636
DATED             : July 1, 2014
INVENTOR(S)       : Gelfand et al.

It is certified that error appears in the above-identified patent and that said Letters Patent is hereby corrected as shown below:

In the claims:

Column 20,
Line 34, "claim 21" should read --claim 31--.

Signed and Sealed this
Second Day of December, 2014

Michelle K. Lee
*Deputy Director of the United States Patent and Trademark Office*